United States Patent Office 3,059,186
Patented Oct. 16, 1962

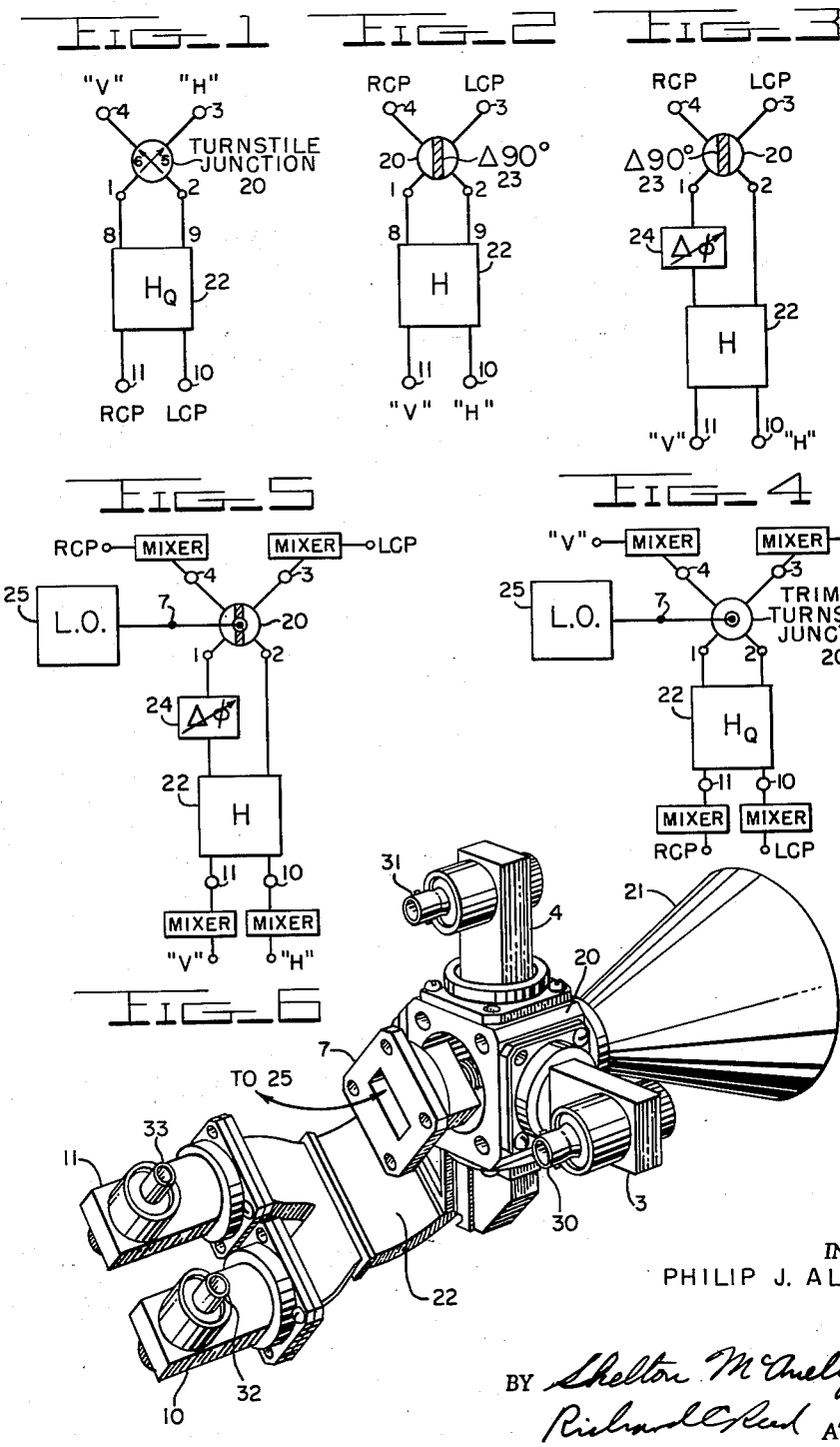

3,059,186
POLARIZATION RESOLVER AND MIXER
Philip J. Allen, 8000 Marion St., North Forestville, Md.
Filed Nov. 30, 1960, Ser. No. 72,817
5 Claims. (Cl. 325—439)
(Granted under Title 35, U.S. Code (1952), sec. 266)

The invention described herein may be manufactured and used by or for the Government of the United States of America for governmental purposes without the payment of any royalties thereon or therefor.

This invention relates to electromagntic wave operative devices in general and in particular to polarization resolver devices capable of receiving an input signal of any polarization and deriving quantities representative of its circular polarization components as well as quantities representative of its linear polarization components.

For various reasons it may be desired to analyze an incoming signal to determine the polarization characteristics of that signal. An example of where such information is desirable is in determining the nature of the signal source. By determining the polarization of the received signal it is possible to ascertain whether or not the distant signal source emits linear polarization or circular polarization, the plane of the linear polarization, the sense of the circular polarization, and many other characteristics. Where the incoming signal is actually a reflected signal as would be encountered with a radar device using pulse echo techniques, it is frequently possible to determine the nature of the distant energy reflective object by analyzing the effect that such an object has upon the polarization of the return signal. An isotropic reflecting object such as a flat plate or a sphere will reverse the sense of circularly polarized waves impinging upon it causing thus a specific action which can be identified. To do this it is usually desired to determine if the return signal has been altered in circular polarization sense. Thus it is desired to have a device which will resolve an incoming signal into components at various ports each having a specific significance as to polarization characteristics of the incoming signal.

It is accordingly an object of the present invention to provide a polarization analyzer which is capable of resolving a signal into various polarization components.

Another object of the present invention is to provide a polarization resolver capable of delivering into four output circuits an analysis of an incoming wave as to sense of circular polarization and linear components in selected orthogonally related planes.

Other objects and many of the attendant advantages of this invention will be readily appreciated as the same becomes better understood by reference to the following detailed description when considered in connection with the accompanying drawings wherein:

FIG. 1 shows a basic embodiment of the teachings of the present invention employing a turnstile junction and a quadrature type 3-db hybrid junction for extracting the polarization components of an incoming wave signal.

FIG. 2 shows a variation of the basic apparatus of FIG. 1 in which a quarter wave plate is inserted in a short section of circular waveguide attached to the incoming signal port of the turnstile junction and a 3-db hybrid junction which is not necessarily of the quadrature type.

FIG. 3 shows a variation of FIG. 2 employing a variable phase shifter in conjunction with the turnstile junction and 3-db hybrid junction.

FIG. 4 shows a further variation of the apparatus of FIG. 1 wherein a trimode turnstile junction is employed to supply a local oscillator signal to mixers thus providing a simple integrated resolver-mixer assembly constituting the entire "front end" of a superheterodyne receiver system.

FIG. 5 shows a further variation of the apparatus of FIG. 3 wherein a trimode turnstile junction is employed to supply local oscillator signal to mixers thus providing a simple integrated resolver-mixer assembly with partial control of polarization.

FIG. 6 is a more or less scale drawing of a complete apparatus of the present invention corresponding to the schematic of FIG. 4.

The polarization state of a polarized wave can be defined in terms of the magnitudes of two orthogonally polarized components and the relative phase angle between these two components. For both practical and analytical convenience a polarized wave is usually resolved into either orthogonal linearly polarized components (vertical and horizontal for example) or orthogonal circularly polarized components (right and left senses). Numerous ways are known in the prior art for resolving a polarized wave into either pair of components, however, in some polarization measurements and applications it is desirable to have both linear and circular components simultaneously available for comparison and other study purposes. The simple microwave polarization resolver of the present invention simultaneously extracts both linearly polarized and circularly polarized components from the input signal.

With reference now to FIG. 1 of the drawing, the apparatus shown therein in schematic form consists of a waveguide turnstile junction and a 3-db quadrature hybrid junction. Both of these components are now well known in the art; however the turnstile junction may be described briefly as containing four rectangular waveguides disposed in a common plane intersecting at equal angles in a common central region. In addition the turnstile junction has a fifth (circular) waveguide input which is in actuality dual "ports" connected to the central region perpendicular to the four waveguides. Such a device is called a six-port turnstile junction because of the dual nature of the fifth port. Brief reference to FIG. 6 will indicate more clearly the nature of the apparatus neglecting for the moment the seventh port in the foreground. The signal to be analyzed enters ports 5 and 6 (the dual mode input) of the turnstile junction through a dominant mode circular waveguide, or possibly directly with an omnipolarized antenna such as a conical horn shown in the apparatus of FIG. 6. The overall device of FIG. 1 resolves the input signal of arbitrary polarization at ports 5 and 6 into components of horizontal, vertical, left circular (LCP), and right circular (RCP) polarization which are then available at ports 3, 4, 10 and 11, respectively, assuming for the present discussion that the particular form of 3-db quadrature hybrid selected is a side wall, short slot directional coupler.

In the apparatus of FIG. 1 the turnstile junction 20 is indicated as having crossed "ports" 5 and 6 which are in reality merely the open end of a circular waveguide whose axis perpendicularly intersects the plane of the rectangular ports 1, 2, 3 and 4. For optimizing of coupling and the like it is normally the case that the cylindrical "ports" 5 and 6 are connected to a suitable horn device already mentioned through a section of cylindrical waveguide of convenient length, the horn device being indicated in FIG. 6 by the reference character 21.

It is characteristic of the turnstile junction that opposing rectangular ports 2 and 4, for example, receive equal signals characteristic of the components of input signals in the plane of "port" 6 whereas the other opposing ports 1 and 3 receive equal signals characteristic of the input in the plane of "port" 5. Ports 1 and 3 are thus excited out-of-phase relative to each other as are the ports 2 and 4. However each one of ports 3 and 4 receives signals characteristic of the input component in the respective plane. Thus if the input is a linearly polarized signal in the plane of "port" 5 a fraction of the signal would be directly delivered to port 3 whereas if the input is a linearly polarized signal at right angles thereto a fraction would be directly delivered to port 4. Linearly polarized signals having an intermediate polarization plane would be resolved to appear in appropriate relationship in both ports 3 and 4. As thus described and defined, the turnstile junction has a plurality of ports, two of them cooperative in a single omni-polarization opening.

The quadrature hybrid 22 of FIG. 1 is well known in the art being a four port device which is typically described as composed of two waveguides disposed in parallel relationship having a common wall in which slots or holes have been placed to cause a transfer of energy between the waveguides. The hybrid junction is called 3-db in that a signal applied to port 8 for example is split between output ports 10 and 11 in equal power and it is called quadrature because the two signals realized in the output ports 10 and 11 resultant to an input signal to port 8 are not in phase but rather bear a 90° phase relationship. When the phase quadrature signals produced by the hybrid responsive to the input signals are added in space quadrature the result can be a circularly polarized wave. Thus to reverse the foregoing discussion for the moment if a waveguide mode signal is applied to the quadrature hybrid at port 10 it would be split equally between ports 8 and 9 and delivered through ports 1 and 2 to the turnstile junction 20. At this point the addition of the phase quadrature signals in space quadrature produces a circularly polarized wave emanating from the ports 5 and 6 and horn 21. This polarized wave would have a first sense opposite to that produced with the same signal applied to the other port 11 of the quadrature hybrid. Thus an output signal of either left or right handed sense could be obtained from the horn 21 merely upon the application of a rectangular waveguide mode linearly polarized signal either to port 10 or 11. For reception with the apparatus of FIG. 1, with circularly polarized signals applied at ports 5 and 6, the device operates in reciprocal fashion to that just described, with waveguide signals being obtained at the ports 10 or 11 as appropriate, dependent upon the sense of the circularly polarized signals themselves. Thus it is typical that port 10 would produce an output characteristic of the left circularly polarized input to 20 and that port 11 would provide an output signal characteristic of the right circularly polarized input at 20.

It is thus seen that the turnstile junction 20 operates in a dual capacity namely, directly through the ports 3 and 4 thereof to provide resolution of incoming signals into vertical and horizontal components and simultaneously and without undesired reaction, provided proper impedance matching has been made to avoid undesired internal reflections, of operating through the ports 1 and 2 thereof with the hybrid junction 22 to provide output signals at ports 10 and 11 characteristic of the resolved circularly polarized components of the input signals. One half of the input power to "ports" 5, 6 thus goes to the linear polarization ports 3 and 4 the other half going to the circular polarization ports 10 and 11 assuming in this connection that the device is substantially lossless.

With reference now to FIG. 2 of the apparatus, the structure indicated therein is similar to that of FIG. 1 with the exception that a quarter wave plate 23 is inserted in the circular waveguide between the turnstile junction 20 and the conical horn 21. The resultant operation of the device is similar to that of FIG. 1 except that a transposition occurs in the signals at the output ports and the quadrature type of hybrid is not specifically required. The quarter wave plate 23 has a critical angular relationship to the ports 3 and 4. For example, a dielectric slab type quarter wave plate would be oriented with its plane half way between the ports 3 and 4 as shown in FIG. 2. With this arrangement the circularly polarized components are obtained at ports 3 and 4 rather than the normal output ports 10 and 11 of the quadrature hybrid, while the linearly polarized components of the input signal are obtained at the output ports 10 and 11 of the quadrature hybrid. With a 3-db hybrid junction of the "180-degree" type being employed in the embodiment of FIG. 2, the ports 10 and 11 will couple to orthogonal linearly polarized waves whose planes of polarization are rotated 45 degrees from the "V" and "H" planes realized when using a 3-db hybrid junction of the quadrature type.

A typical utility of the device of FIG. 2 is as a polarization resolver for reception purposes where a signal of arbitrary polarization enters the horn 21 and would be resolved into four components which could be compared subsequently in various ways. It does not specifically require the quadrature type of hybrid and when the 180° type of hybrid is employed, it provides a 45° change in the planes of the linear components.

FIG. 3 features variable orientation of the linear components, being primarily a modification of the apparatus of the previously described FIG. 2 including a variable phase shifter 24 disposed in the interconnection of components 20 and 22. Although phase shifter 24 is shown as being located in only one of the interconnecting paths, actually a dual differential phase shifter arrangement could be employed wherein the phase of the signal in one path can be varied in one sense and that of the other in the opposite sense.

The purpose of providing the variable phase shift is to make it possible to vary the spatial orientation of the linear components.

By employing detectors at ports 3, 4, 10 and 11, the apparatus previously described yields relative amplitude information as to the various polarization components involved. In many instances this form of information is adequate, however, to completely define signal polarization in terms of a single pair of orthogonal components requires determination of their relative phase angle. Such a phase measurement can be made at R.F. or at I.F. provided any phase errors introduced by the measurement apparatus are inconsequential.

Linear conversion of the four output components of the apparatus to an intermediate frequency for more convenient phase angle comparison is readily accomplished with a variant of the foregoing apparatus by inserting a local oscillator signal into the apparatus in such a way as to obtain uniform delivery to all of the output ports. Such an arrangement is evolved first in connection with FIG. 4 which is basically similar to the previously described FIG. 1 with the exception that a "trimode" or "seven port" turnstile junction 20 is employed in place of the "dual mode" six port turnstile junction of FIGS. 1, 2 and 3. The trimode turnstile junction is well known in the art, the seventh port being an input coaxial port which is also perpendicular to the plane of the rectangular ports and opposite the circular "port" of 5 and 6. It is characteristic of such a trimode turnstile junction 20 that signals applied to the seventh port are divided to appear equally and in phase at each of the rectangular waveguide ports 1, 2, 3 and 4. The coaxial port 7 is coupled normally by way of a transition to waveguide, the waveguide then forming a connection to local oscillator 25, the entire arrangement being indicated in greater detail in the more or less pictorial presentation of FIG. 6. Thus the apparatus will provide not only the components of the input signal intercepted by "ports" 5 and 6 at the output ports 3, 4, 10 and 11 but will also provide equal amplitude components of the signal from the local oscillator 25 at each of the ports 3, 4, 10 and 11, assuming use of a quadrature hybrid junction 22. With the frequency of the local oscillator 25 properly arranged or adjusted, the addition of some nonlinear device can produce a heterodyning of these two signals at each port to produce a lower frequency signal commonly known as the intermediate frequency signal for a superheterodyne receiver. Such an arrangement is contained within the apparatus of FIG. 6, each of the ports 3, 4, 10 and 11 having suitable provision made therein to contain a crystal mixer of conventional configuration for waveguide structures by means of which mixing of the two signals can be obtained resulting in the production of intermediate frequency signals at the output terminals 30, 31, 32 and 33 which are representative in amplitude of the amplitudes of the radio frequency signals at ports 3, 4, 10 and 11 and also representative of the phasing of the various components. If the overall apparatus is constructed in such a way as to maintain precise symmetry in the overall assembly, something which is not extremely difficult due to the basic symmetrical arrangement of the apparatus in the first place, the relative phase and amplitude of each pair of components is preserved in the resultant intermediate frequency signals which can be delivered to separate intermediate frequency amplifiers for conventional amplification.

The apparatus of FIG. 5 is a variation of the preceding apparatus of FIG. 3 with local oscillator signal injection through the coaxial port as in FIG. 4.

The injection of the local oscillator signal in FIG. 5 does provide some restriction over the flexibility described for the preceding FIG. 3 in that the amplitude of the local oscillator power reaching the mixers on ports 10 and 11 is dependent upon both the differential phase shift and the type of hybrid junction employed. As a consequence the variable phase shifter 24 becomes more a polarization trimmer device for the polarization linear components by means of which precise alignment of the polarization planes is possible.

The apparatus of the present invention, particularly with regard to FIGS. 4, 5 and 6, preserves in the intermediate frequency signals the sense and character of the input polarized wave, and hence can be employed in a polarimeter to view the polarization state of the incoming wave. This is accomplished by linearly adding in space quadrature the "vertical" and "horizontal" components using a suitable oscilloscope. Although sense of the input polarized signal is implicit in the direction of spot motion on the oscilloscope, sense of the input polarized wave is readily determined by making a simple amplitude comparison of the two circularly polarized components out of the resolver device; the sense of the circular component of larger amplitude determines the sense of the input polarized wave.

Obviously many modifications and variations of the present invention are possible in the light of the above teachings. It is therefore to be understood that within the scope of the appended claims the invention may be practiced otherwise than as specifically described.

What is claimed is:

1. An electromagnetic wave operative device comprising, a turnstile junction having four radial ports disposed at right angular relationship and an axial port, the axial port having omni-polarization transmission characteristics, means for coupling the axial port to space, a four port hybrid junction having its ports functionally identified in pairs as to input and output ports, means for connecting a first pair of the ports of the hybrid junction to two mutually adjacent radial ports of the turnstile junction, and means for producing phase quadrature in the coupling between space and the second pair of ports of the hybrid junction.

2. An electromagnetic wave operative device comprising, a turnstile junction having four radial ports disposed at right angular relationship and an axial port, the axial port having omni-polarization transmission characteristics, means for coupling the axial port to space, a four port hybrid junction having its ports functionally identified in pairs as to first and second pairs of ports, means for connecting a first pair of the ports of the hybrid junction to two mutually adjacent radial ports of the turnstile junction, and a quarter wave plate disposed within said first named means.

3. An electromagnetic wave operative device comprising, a turnstile junction having four radial ports disposed at right angular relationship and an axial port, the axial port having omni-polarization transmission characteristics, means for coupling the axial port to space, a four port hybrid junction having its ports functionally identified in pairs as to first and second pairs of ports, means for connecting a first pair of the ports of the hybrid junction to two mutually adjacent radial ports of the turnstile junction, a quarter wave plate disposed within said first named means, and phase shift means disposed within said second named means for controlling the relative phasing of the coupling between the hybrid junction and the turnstile junction.

4. An electromagnetic wave operative device comprising, a turnstile junction having four radial ports disposed at right angular relationship and an axial port, the axial port having omni-polarization transmission characteristics, means for coupling the axial port to space, a four port quadrature type hybrid junction having its ports functionally identified in pairs as to first and second pairs of ports, means for connecting a first pair of the ports of the hybrid junction to two mutually adjacent radial ports of the turnstile junction, means for applying a local oscillator signal to the turnstile junction, and mixer means connected to the two radial ports of the turnstile junction not connected to the hybrid junction and to the second pair of ports of the hybrid junction whereby superheterodyne action can occur between the local oscillator signal and signals picked up by said first named means.

5. An electromagnetic wave operative device comprising, a turnstile junction having four radial ports disposed at right angular relationship and an axial port, the axial port having omni-polarization transmission characteristics, means for coupling the axial port to space, a four port hybrid junction having its ports functionally identified in pairs as to first and second pairs of ports, means for connecting a first pair of the ports of the hybrid junction to two mutually adjacent radial ports of the turnstile junction, a quarter wave plate disposed within said first named means, phase shift means disposed within said second named means for controlling the relative phasing of the coupling between the hybrid junction and the turnstile junction, means for applying a local oscillator signal to the turnstile junction, and mixer means connected to the two radial ports of the turnstile junction not connected to the hybrid junction and to the second pair of ports of the hybrid junction whereby superheterodyne action can occur between the local oscillator signal and signals picked up by said first named means.

References Cited in the file of this patent

UNITED STATES PATENTS

| 2,830,288 | Dicke | Apr. 8, 1958 |
| 2,848,716 | Mattingly | Aug. 19, 1958 |
| 2,851,687 | Sferrazza | Sept. 9, 1958 |
| 2,918,673 | Lewis et al. | Dec. 22, 1959 |
| 2,929,058 | Blasberg et al. | Mar. 15, 1960 |
| 2,965,898 | Lewis | Dec. 20, 1960 |